(12) United States Patent
Praesenz

(10) Patent No.: US 9,272,797 B2
(45) Date of Patent: Mar. 1, 2016

(54) TOOL ARRANGEMENT WITH DETACHABLE TOOL LOCKING

(75) Inventor: Juergen Praesenz, Markt Rettenbach (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 919 days.

(21) Appl. No.: 13/463,872

(22) Filed: May 4, 2012

(65) Prior Publication Data

US 2012/0279171 A1 Nov. 8, 2012

(30) Foreign Application Priority Data

May 4, 2011 (DE) .......................... 10 2011 100 429

(51) Int. Cl.

| | |
|---|---|
| *B65B 59/04* | (2006.01) |
| *B23B 31/30* | (2006.01) |
| *B65B 7/16* | (2006.01) |
| *B65B 51/10* | (2006.01) |
| *B29C 65/74* | (2006.01) |
| *B29C 65/78* | (2006.01) |
| *B29C 65/00* | (2006.01) |

(52) U.S. Cl.
CPC .................. *B65B 7/164* (2013.01); *B65B 51/10* (2013.01); *B65B 59/04* (2013.01); *B29C 65/74* (2013.01); *B29C 65/749* (2013.01); *B29C 65/787* (2013.01); *B29C 66/53461* (2013.01); *B29C 66/8167* (2013.01); *B29C 66/8322* (2013.01); *B29C 66/849* (2013.01); *B29C 66/9672* (2013.01); *B29C 66/9674* (2013.01); *Y10T 279/1224* (2015.01)

(58) Field of Classification Search
CPC ........ B25J 15/04; B23B 31/107; B23B 31/30; B65B 51/26; B65B 59/04; B65B 51/10; B29C 65/74; B29C 65/749; B29C 65/787; B29C 66/8167; B29C 66/849; Y10T 279/1224
USPC ........................ 53/285, 329, 559, 201, 393, 53/329.3–329.5, 281; 483/2; 100/347, 100/229 R; 279/2.11, 2.23, 2.06, 4.1, 4.12, 279/4.01, 4.04, 904
See application file for complete search history.

(56) References Cited

U.S. PATENT DOCUMENTS

| | | | | |
|---|---|---|---|---|
| 4,372,738 | A * | 2/1983 | Black et al. ................. | 425/451.9 |
| 6,527,266 | B1 * | 3/2003 | Yonezawa et al. ............ | 269/309 |
| 2004/0046302 | A1 * | 3/2004 | Bernhard et al. ............. | 269/309 |

FOREIGN PATENT DOCUMENTS

| | | |
|---|---|---|
| DE | 3026295 A1 | 2/1982 |
| DE | 3705123 A1 | 9/1998 |

(Continued)

OTHER PUBLICATIONS

German Official Notification Dated Jan. 3, 2012, Application No. 10 2011 100 429 0, Applicant Multivac Sepp Haggenmueller GmbH & Co. KG, 4 Pages.

*Primary Examiner* — Robert Long
*Assistant Examiner* — Xavier A Madison
(74) *Attorney, Agent, or Firm* — Husch Blackwell LLP

(57) ABSTRACT

The disclosure relates to a tool arrangement, comprising a tool holder, a tool, and at least one locking device for detachably locking the tool with the tool holder, wherein a counter-tool is provided and the tool holder includes a compressed-air duct. The locking device is designed such that it unlocks as soon as a given pressure has been reached in the compressed-air duct. The disclosure is distinguished by a vent hole which is in fluid connection with the compressed-air duct and is arranged in such a manner that it is not closed until the tool rests upon the counter-tool.

14 Claims, 5 Drawing Sheets

(56) References Cited

FOREIGN PATENT DOCUMENTS

| | | |
|---|---|---|
| DE | 202004016538 U1 | 2/2005 |
| DE | 102008032306 A1 | 1/2010 |
| DE | 202011002723 U1 | 1/2012 |
| EP | 1234765 A1 | 8/2002 |
| EP | 1690794 A1 | 8/2006 |

\* cited by examiner

TOOL ARRANGEMENT WITH DETACHABLE TOOL LOCKING

CROSS-REFERENCE TO RELATED APPLICATIONS

This application claims foreign priority benefits under 35 U.S.C. §119(a)-(d) to German patent application number DE 102011100429.0, filed May 4, 2011 which is incorporated by reference in its entirety.

TECHNICAL FIELD

The present disclosure relates to a tool arrangement.

BACKGROUND

In packaging machines, tools or tool parts often have to be changed or replaced. While packaging machine tool wear is comparatively low, it is the main purpose of tool changes in packaging machines not to change worn-out tools but to take out a tool for cleaning purposes or to change a tool of a first format by a tool of another format. After such format change, packages of a varying form can be produced.

For this purpose, DE 20 2004 016 538 U1 reveals a sealing station of a deep-drawing packaging machine for changing or replacing a sealing cassette. To this end, such sealing cassette is a manageable unit. The sealing cassette can be detached or released by an operator from an upper sealing part via bolted connections and can be changed by further sealing cassettes so as to facilitate the retrofitting of the tools for alternating packaging forms. However, such format change is comparatively labor-intensive.

A tray sealing machine according to DE 10 2008 032 306 A1 comprises a lifting and sealing means, the movable sealing tool thereof being retractable from an upper chamber part. To this end, the lifting spindle arranged above the sealing tool is moved out of its rotatable spindle nut at the upper chamber part and can be replaced by another sealing tool.

DE 20 2011 002 723.6 and DE 10 2010 056 318.8 which both had not yet been published at the date of the present application each describe a packaging machine with changeable tool. To this end, a locking device is provided in order to release or unlock the tool plate to be replaced from the tool with no tools required. The locking device may comprise a locking bolt which is movable by means of compressed so as to be unlocked.

SUMMARY

It is the object of the present disclosure to improve such a tool arrangement in such a manner that, in case of a tool change, utmost security for both the operator of the tool arrangement and the packaging machine itself is guaranteed.

The inventive tool arrangement comprises a compressed-air duct, and a locking device for the tool is configured such that it will unlock as soon as a predetermined unlocking pressure in the compressed-air duct has been reached. Further, the inventive tool arrangement comprises a vent hole which is in fluid connection with the compressed-air duct and is arranged such that it is closed when the tool and a counter-tool are in contact with each other. The counter-tool may be a simple supporting means or a supporting table, or just as well a tray retainer or socket for trays to be sealed, or a lower tool which cooperates with the tool to be changed.

The compressed-air duct is vented by the vent hole until there is a close contact between the tool and the counter-tool. Before such contact, the vent hole prevents that the pressure required for unlocking is built up. In other words: the vent hole according to the disclosure serves as a safety means, as it prevents the unlocking pressure being built-up and, thus, the tool being unlocked, until the tool to be changed rests on the counter-tool. It is, thus, ensured that the unlocked tool cannot fall down in an uncontrolled manner, as it is supported by the counter-tool. After being unlocked, the tool can be removed e.g., to the sides by means of the counter-tool. If need be, there also might be provided a guide between tool and counter-tool, in order to determine the movement of the unlocked tool relative to the counter-tool. It might also be conceivable to have the counter-tool lowered with the tool being deposited thereon so as to make removing the tool from the tool arrangement easier.

The operational safety of the tool arrangement according to the disclosure can be further enhanced by providing a plurality of locking devices; the advantage being that such locking devices are distributed at a plurality of locations between the tool and the tool holder so that each of said locking devices has to absorb minor forces.

In case a plurality of locking devices are provided it is especially favorable to have a compressed-air duct provided by means of which the pressure in the compressed-air duct can simultaneously be applied to each of said locking devices. Thus, it is made sure that all of said locking devices unlock simultaneously so as to avoid any tilting of the tool while being unlocked from the tool holder.

As regards the vent hole it is advantageous to provide same at a tool surface. The vent hole is being sealed when said tool surface comes to lie flat against another tool surface as soon as the tool reaches a certain position. Such a surface contact may, for example, correspond to the tool support on the counter-tool. For this purpose it would be especially advantageous to have the vent hole provided at a tool surface facing the counter-tool.

A vent duct passing through the tool can be provided between compressed-air duct and vent hole. Owing to said vent duct compressed air can escape through the vent duct and through the vent hole so that any unlocking pressure build-up is prevented until the vent hole will be closed. Further, such vent duct enables to arrange the vent hole at the side facing away from tool holder of the tool.

According to an advantageous variant of the disclosure, a bridging mandrel for bridging a distance between the tool holder and the tool by means of the vent duct is provided. Such bridging mandrel allows for having the vent duct in the tool extended up into the interior of the tool holder, where it is brought into fluid connection with the compressed-air duct.

Moreover, the tool arrangement according to the disclosure may comprise at least one (flexible) sealing annularly lying around the vent hole and/or around a bridging mandrel socket which is provided in the tool holder. The first of such sealings can make easier proof sealing of the vent hole and, thus, the build-up of the unlocking pressure in the compressed-air duct. A sealing provided around the bridging mandrel improves a fluid-tight connection between the compressed-air duct and the vent hole, thus avoiding that compressed-air can escape between the tool and the tool holder which otherwise might hamper the build-up of the unlocking pressure.

The sealing will become especially tight when it includes a cone-shaped portion.

The operational safety of the tool arrangement according to the disclosure can be further improved in that the locking device has been pre-stressed in its locked position, thus making sure that the locking condition will be maintained even if the tool arrangement or the working station of a packaging machine contained therein drops out or the compressed-air is interrupted.

The disclosure also appears in a tool arrangement having a first boundary face to which a first tool part and another tool part can detachably be locked with each other by means of at least one locking device, and another boundary face to which said second tool part (to be changed or replaced) and a third tool part can detachably be attached. To this end, a compressed-air system has been provided so as to unlock said at least one locking device when an unlocking pressure is built-up in the compressed-air system, and a vent hole provided at the second boundary face and being in fluid connection with said compressed-air system can be closed when said second tool part is attached to said third tool part. Accordingly, the build-up of the unlocking pressure will be avoided until the second and the third tool part are in close contact with one another at said second boundary face.

The tool arrangement according to the disclosure can especially be used in a working station of a packaging machine, for instance in a molding, a sealing or in a cutting station. When used in a sealing station, the tool holder is e.g., the upper tool, the tool is the sealing plate, and the counter-tool is the lower tool or the tray socket of a lower tool of said sealing station.

Finally, the disclosure also refers to a packaging machine comprising a tool arrangement as described above.

In the following, an advantageous embodiment of the disclosure will be described in more detail with reference to the below drawings.

DETAILED DESCRIPTION

Same components in the Figures are given the same reference numbers throughout the text.

Figure 1:
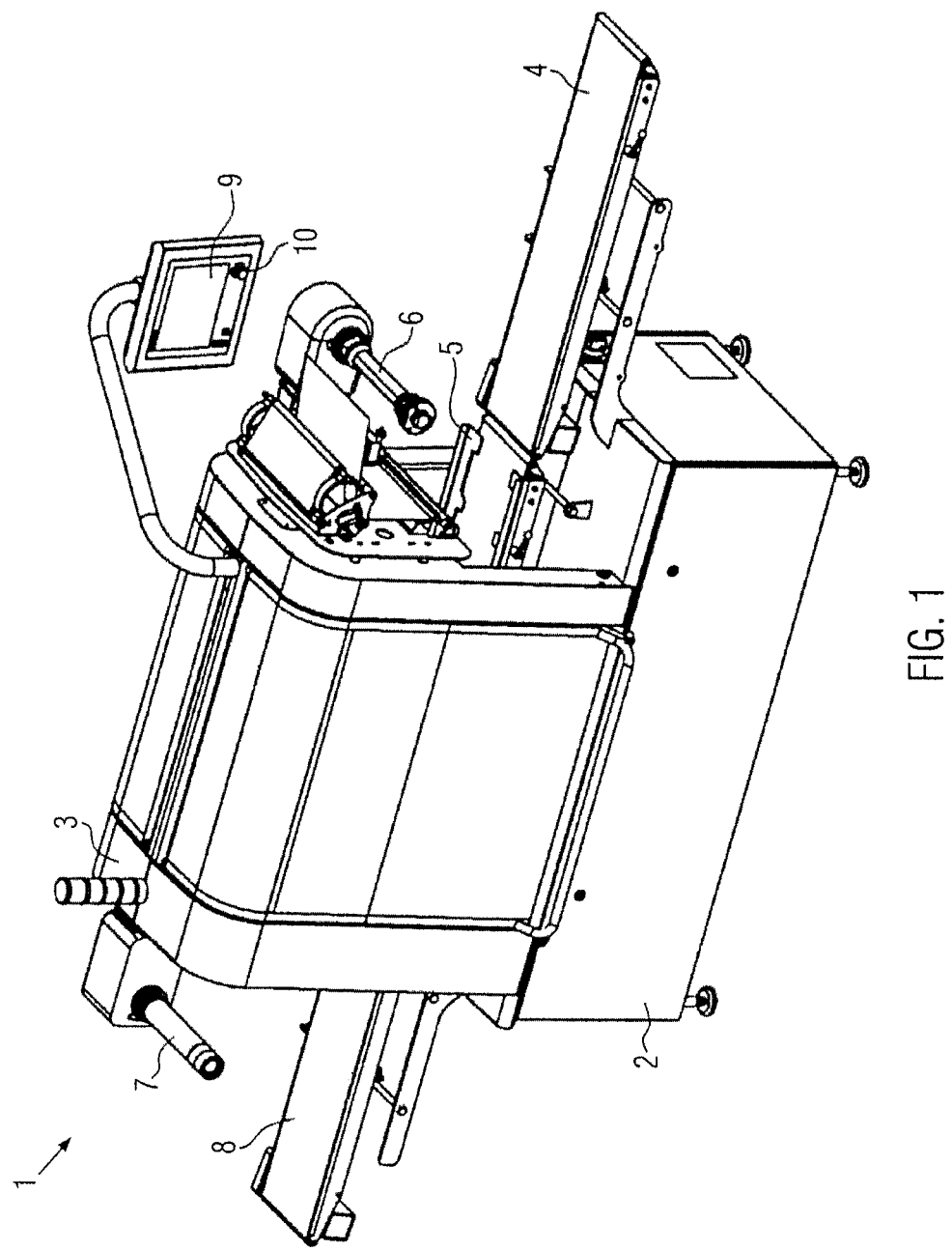
FIG. 1 is an embodiment of an inventive packaging machine in the form of a tray sealing machine (tray sealer)

FIG. 1 is a perspective view of a packaging machine 1 according to the disclosure in the form of a tray sealer. A stage or frame 2 carries the working station 3 of the packaging machine, which is, in the present case, a gassing, a sealing and a cutting station. A conveyor belt 4 transports charged packaging trays (not shown) to the working station 3. A gripper 5 with lateral gripper jaws seizes the packaging trays and conveys them into the working station 3. A lid foil is pulled off from a foil dispenser 6 and also guided into the working station 3. After having evacuated and/or gassed the trays by means of an exchange gas (MAP), the packaging trays will be sealed in air-tight manner by means of the lid foil pulled off from the foil dispenser 6. A cutting tool is used to cut out the lid foil properly from said lid foil so as to match the packaging trays. The residual lid foil grid is wound onto a residual foil winder 7. The sealed and isolated packages are placed onto a discharge belt 8 and transported out of the working station 3 or the packaging machine 1. A display 9 and control elements 10 visualize operation and operating condition of the packaging machine 1 and enable an operator to operate the packaging machine 1.

Figure 2:
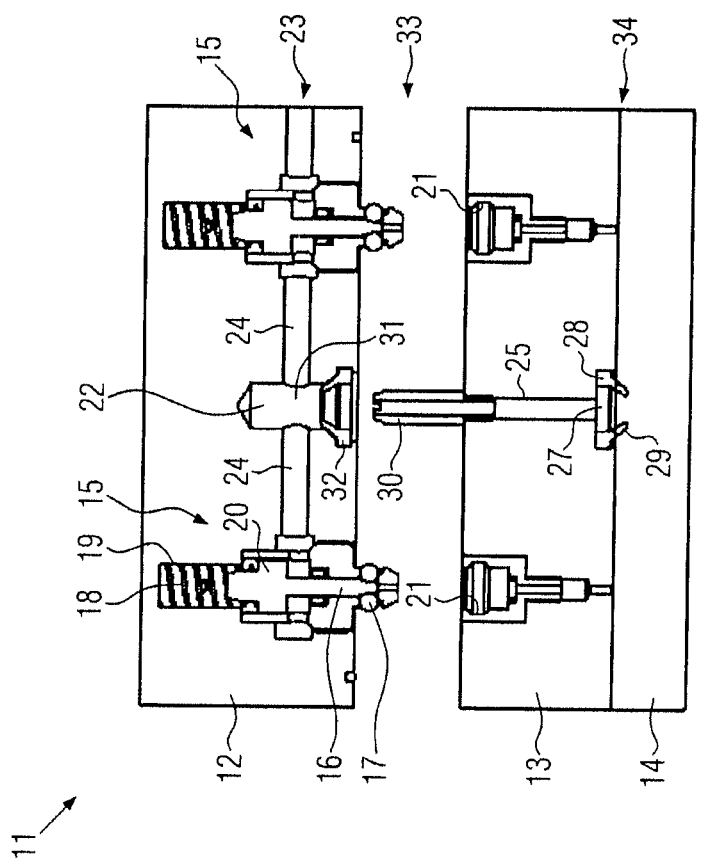
FIG. 2 is a vertical section through an inventive tool holder with the tool being unlocked.

Inside the working station 3 of the packaging machine 1 is provided a tool arrangement 11 according to the disclosure which is schematically shown in FIG. 2 in vertical section. Such tool arrangement comprises a tool holder or a first tool part 12, a replaceable tool or another tool part 13 and a counter-tool or a third tool part 14. These parts are arranged in vertical direction one upon the other, i.e., the replaceable tool 13 is positioned above the counter-tool 14 and the tool holder 12 is positioned above tool 13.

A number of locking devices 15, of which two can be seen in the vertical section according to FIG. 2, are used to detachably lock the replaceable tool 13 to the tool holder 12. Each of said locking devices comprises a vertically oriented locking bolt 16 which is provided in the tool holder 12. The lower end of locking bolt 16 is conically shaped. The conical faces of said lower end of locking bolt 16 act upon locking elements such as locking balls 17 which are pre-stressed, e.g., by means of an O-ring, towards the inside and distributed around the lower end of said locking bolt 16.

Figure 4:
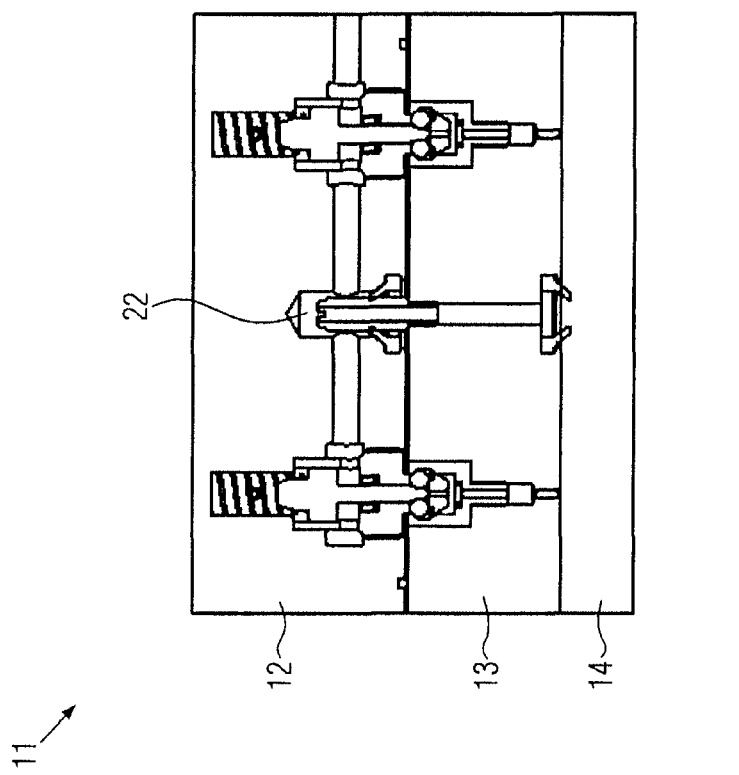
FIG. 4 is a vertical section through the tool arrangement shown in FIGS. 2 and 3 directly while being locked.
Figure 5:
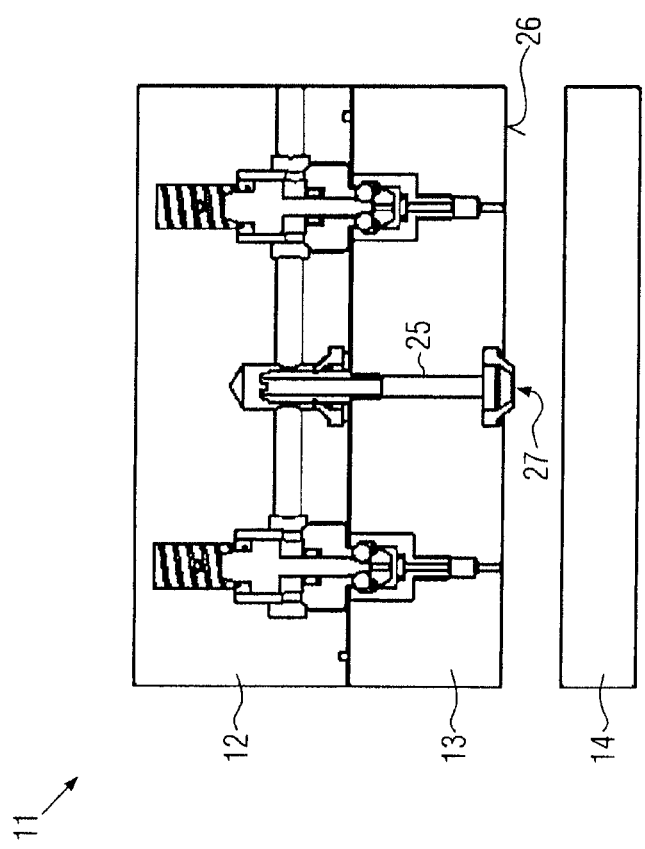
FIG. 5 is the tool holder shown in FIGS. 2 to 4 with the locked tool being lifted.

A spring 18 is provided in a bore 19 in the tool holder and supports on a laterally projecting bead 20 of locking bolt 16. Thus, the locking bolt 16 is pre-stressed by the pressure spring 18 downwards into its locked position where it urges the locking balls 17 horizontally outwards. If the tool 13 is now in contact with the tool holder 12, the locking elements 17 get into locking engagement with locking grooves 21 in tool 13, as can be seen in FIGS. 4 and 5. Thus, the tool 13 or the second tool part 13 has detachably been locked to the tool holder or to the first tool part 12.

Inside tool holder 12 is further provided a compressed-air system (or compressed-air duct system) 22. Said compressed-air duct system 22 is connected to a permanently operating or a controllable compressed-air source. The compressed-air source can be connected via a connecting port 23 of said compressed-air system 22.

Moreover, compressed-air system 22 comprises a compressed-air duct 24 leading to each of said locking devices 15. Compressed-air ducts 24 are connected to each locking device 15, respectively, such that the side of flange 20 of locking bolt 16 facing away from pressure spring 18 is pressurized by the compressed air. Hence follows that locking bolt 16 moves upwards into its unlocked position against the force of pressure spring 18 as soon as the pressure prevailing in compressed-air duct 24 reaches or exceeds a given unlocking pressure. Compressed-air duct system 22 combines all locking devices 15 with each other via appropriate compressed-air ducts 24 so that all of said locking devices 15 simultaneously reach the unlocking pressure so as to unlock.

Tool 13 that can be replaced, e.g., for a format change, comprises a vent duct 25 passing through the tool 13 top down. On surface 26 of tool 13 facing counter-tool 14 (see FIG. 5), vent duct 25 opens up so as to form a vent hole 27. A first sealing 28 with a downwards truncated portion 29 is lying around vent hole 27 in order to seal vent hole 27 against counter-tool 14 in an air-tight manner when the tool 13 contacts the counter-tool 14 (which might be e.g., a lower tool or a tray socket or retainer).

The end of vent duct 25 opposite to vent hole 27 has been extended by means of a bridging mandrel 30 upwardly projecting away from the tool 13. A socket or retainer 31 in the tool holder 12 serves to receive the bridging mandrel 30 therein. Socket 31 is in fluid connection with compressed-air duct system 22. Another sealing 32 having a form which corresponds in the present embodiment to that one of the first sealing 28 extends along the margin of socket 31 so as to seal socket 31 against bridging mandrel 30 in an air-tight manner towards outside.

Between tool holder 12 and replaceable tool 13 a boundary area 33 is formed to which tool holder 12 and tool 13 can detachably be locked with each other by means of locking devices 15. When in the locked position, tool holder 12 and tool 13 are in contact with each other at said first boundary area 33. According to FIG. 3, tool 13 and counter-tool 14 are in contact with each other at another boundary area 34. To this end, counter-tool 14 serves as a supporting means where the unlocked tool 13 is deposited.

In the following, changing the tool 13 in the tool arrangement 11 will be explained with regard to FIGS. 2 to 5.

A guide and/or a stop can be provided to enable the operator to position tool 13 safely on counter-tool 14 at the position shown in FIG. 2. Said position of tool 13 is distinguished in that tool 13 can be guided to tool holder 12 by means of a vertical lifting movement such that tool 13 can be locked there.

Figure 3:
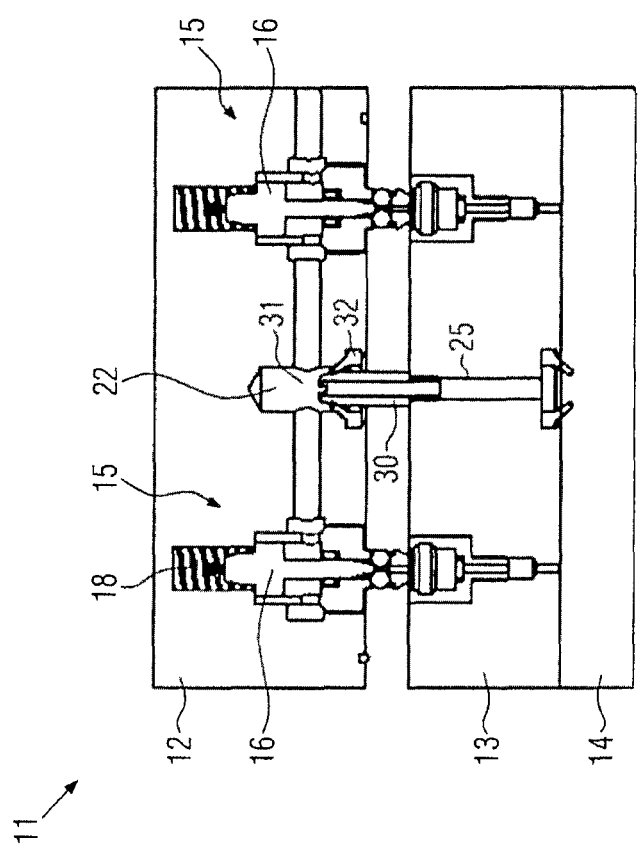
FIG. 3 is a vertical section through the tool arrangement shown in FIG. 2 just before locking.

The movement of tool 13 is shown in FIG. 3. The counter-tool 14 can be in the form of a lifting device and serve to lift tool 13 disposed thereon upwards to tool holder 12. According to the situation shown in FIG. 3, the distance between tool 13 and tool holder 12 at first boundary area 33 has diminished to such an extent that it became smaller than the height of bridging mandrel 30. As a consequence, the tip of bridging mandrel 30 enters into socket 31, and sealing 32 seals bridging mandrel 30 against the wall of tool holder 12. Vent duct 25 in tool 13 is, thus, in fluid connection with the compressed-air duct system 22. Above all, however, the port of compressed-air duct 22 at socket 31 has been closed due to the sealing engagement between sealing 32 and bridging mandrel 30. It has, thus, become possible to build-up an unlocking pressure in compressed-air duct system 22 for moving locking bolts 16 against the force of pressure springs 18 upwards, as vent hole 27 is simultaneously closed. Accordingly, locking devices 15 unlock simultaneously, i.e., owing to the return movement of locking bolt 16, locking elements 17 can move inwards.

This, in turn, enables the locking devices 15 to enter into tool 13 while tool 13 is further lifted, as shown in FIG. 4. FIG. 4 shows the situation where tool 13 is docked to tool holder 12 at the first boundary area 33. As soon as the pressure again lowers in compressed-air duct system 22, locking bolts 16 pre-stressed by pressure springs 18 are moving downwards, thus urging locking balls 17 towards outside, due to their conical ends. Locking balls 17 then get into engagement with locking grooves 21 in tool 13, whereupon tool 13 becomes interlocked with tool holder 12.

As shown in FIG. 5, tool 13 is held at tool holder 12 by such interlocking, even though counter-tool 14 is now being lowered again and unlocks from tool 13. Unlocking the counter-tool 14 from tool 13 causes vent hole 27 to open up at second boundary area 34. The compressed air contained in the compressed-air duct system 22 can continuously escape therethrough so that no unlocking pressure can be built-up in the compressed-air ducts 24 of the compressed-air duct system 22, thus ensuring that tool 13 cannot be released unintentionally from tool holder 12. Instead, locking devices 15 cannot unlock or release again until—as shown in FIG. 4—tool 13 is again in contact with counter-tool 14. As only then vent hole 27 will be sealed again, and the unlocking pressure can be built-up in compressed-air duct system 22.

Starting from the embodiment as shown, the disclosure may of course be amended in various forms. For instance, it may be conceivable to use such a tool arrangement 11 at any location in a packaging machine 11 or in any other machine.

Although one locking device 15 for locking tool 13 to tool holder 12 would suffice, it might also be possible to provide not only two, but also three, four or even more locking devices 15 for locking tool 13.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool arrangement comprising:
    a tool holder including a first compressed-air duct;
    a tool lockable with the tool holder in a locked position, said tool having a second compressed-air duct in fluid communication with said first compressed-air duct in said locked position, wherein said tool includes an air vent on a surface of said tool, said air vent in fluid communication with said second compressed-air duct;
    at least one locking device in fluid communication with said first compressed-air duct, said locking device for detachably locking the tool to the tool holder in the locked position;
    a counter-tool disposed for movement relative to the tool between a disengaged position and an engaged position, said counter-tool contacting said surface of the tool in said engaged position to sealingly close said air vent of said tool; and
    the at least one locking device including a release mechanism for releasing the locking device from said tool upon the application of a pre-determined pressure;
    a compressed-air source for applying said predetermined pressure to release the at least one locking device when said tool and said tool holder are in the locked position and said counter-tool is in the engaged position.

2. The tool arrangement according to claim 1, further comprising a plurality of the at least one locking device.

3. The tool arrangement according to claim 1, wherein the tool holder comprises a socket, and said tool further comprises a bridging mandrel disposed to be received in said socket for bridging a distance between the tool holder and the tool, said bridging mandrel providing fluid communication between said first compressed-air duct and said second compressed-air duct.

4. The tool arrangement according to any claim 1, wherein the locking device is pre-stressed in the locked position.

5. A tool arrangement comprising:
    a tool holder including a first compressed-air duct and at least one locking device in fluid communication with said first compressed-air duct;
    a tool comprising at least one locking groove for receiving the at least one locking device when said tool is in a locked engagement with said tool holder, the tool having a second compressed-air duct in fluid communication with said first compressed-air duct when said tool is in said locked engagement with said tool holder, said tool further comprising an air vent disposed on a surface of said tool and in fluid communication with said second compressed-air duct;
    a counter-tool disposed for movement relative to said tool between a disengaged position and an engaged position, wherein said counter-tool contacts said surface of said tool in said engaged position;
    wherein said counter-tool closes said air vent in said engaged position; and wherein said locking device includes a release mechanism activated upon application of a defined pressure of compressed air, and wherein said defined air pressure of compressed air can only be reached when said counter-tool closes said air vent in said engaged position.

6. The tool arrangement according to claim 5, wherein a plurality of locking devices are provided.

7. The tool arrangement according to claim 6, wherein each of said plurality of locking devices is in fluid communication with said first compressed-air duct.

8. The tool arrangement according to claim 5, wherein said second compressed-air duct passes through the tool between the first compressed-air duct and the air vent.

9. The tool arrangement according to claim 5, wherein a bridging mandrel is provided for bridging a distance between the tool holder and the tool, said bridging mandrel providing fluid communication between said first compressed-air duct and said second compressed-air duct.

10. The tool arrangement according to any claim 5, said tool further comprises a sealing on the surface annularly lying around the air vent.

11. The tool arrangement according to claim 10, wherein the sealing includes a truncated portion.

12. The tool arrangement according to claim 5, wherein the locking device is pre-stressed in the locked position.

13. The tool arrangement according to claim 5 further comprising a compressed-air source in fluid communication with said first compressed-air duct for providing air pressure to said tool arrangement.

14. A tool arrangement comprising:
a first tool part and a second tool part which can be detachably locked together in a locked position by at least one locking device of said first tool part engaging at least one locking groove of said second tool part, said at least one locking device having a release mechanism that is triggered upon the application of a pre-defined release air pressure;
a first boundary area defined by the engagement of the first and second tool part in the locked position, the first boundary area placing a first compressed-air duct of said first tool part in fluid communication with a second compressed-air duct of said second tool part;
a third tool part moveable relative to the second tool part between a disengaged position and an engaged position wherein the third tool part is detachably attached to said second tool part in said engaged position;
a second boundary area defined by the engagement of the second tool and the third tool in said engaged position, the second boundary area closing a vent hole disposed on a surface of said second tool part; and
a compressed-air system in fluid communication with said first compressed-air duct, said compressed-air system for applying the predefined release air pressure to release said at least one locking device when said first and second boundary areas are defined.

\* \* \* \* \*